Oct. 26, 1965　　　L. O. HEFLINGER　　　3,214,687
METHOD AND APPARATUS FOR MEASURING A DIMENSION OF
A CYLINDRICAL CONDUCTOR BY DEVELOPING A MAGNETIC
FIELD TO INDUCE A VOLTAGE INDICATIVE
OF THE DIMENSION

Filed June 15, 1960　　　　　　　　　　　2 Sheets-Sheet 1

LEE O. HEFLINGER
INVENTOR.

BY *Jerry A. Dinardo*
AGENT
*Albert Rosen*
ATTORNEY

Oct. 26, 1965
L. O. HEFLINGER
3,214,687
METHOD AND APPARATUS FOR MEASURING A DIMENSION OF
A CYLINDRICAL CONDUCTOR BY DEVELOPING A MAGNETIC
FIELD TO INDUCE A VOLTAGE INDICATIVE
OF THE DIMENSION
Filed June 15, 1960
2 Sheets-Sheet 2
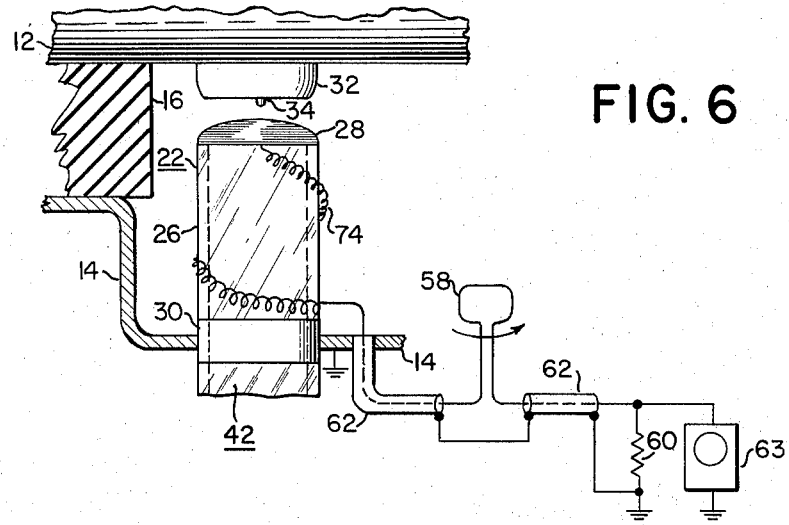
FIG. 6
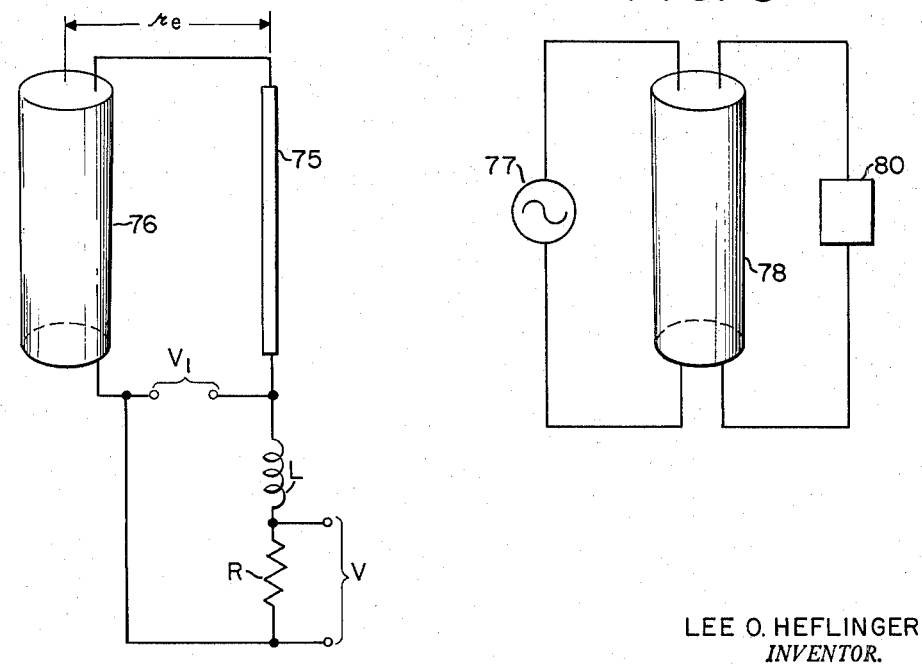
FIG. 7
FIG. 8
LEE O. HEFLINGER
INVENTOR.
BY Jerry A. Dinardo
AGENT
Albert Rosen
ATTORNEY

United States Patent Office 3,214,687
Patented Oct. 26, 1965

3,214,687
METHOD AND APPARATUS FOR MEASURING A DIMENSION OF A CYLINDRICAL CONDUCTOR BY DEVELOPING A MAGNETIC FIELD TO INDUCE A VOLTAGE INDICATIVE OF THE DIMENSION
Lee O. Heflinger, Torrance, Calif., assignor, by mesne assignments, to TRW Inc., a corporation of Ohio
Filed June 15, 1960, Ser. No. 36,198
13 Claims. (Cl. 324—34)

This invention relates to measuring arrangements, and particularly to a method and apparatus for measuring the dimensions of an electrically conductive body. The invention has particular utility in measuring the dimensions of an electrically conductive body under circumstances that preclude or hamper the use of conventional measuring devices.

Instances arise where a body may not be easily accessible to permit the use of conventional dimension measuring devices, for instance a partially machined metal work piece. In other instances it may be desired to measure a dimension of a body such as the radius of a gaseous cylindrical conductor, which dimension changes rapidly as a function of time.

In the study of high temperature gaseous or plasma phenomena, a so-called pinch tube is sometimes used. In such a pinch tube a gas, such as hydrogen or deuterium confined within a cylindrical container, is heated to extremely high temperatures by subjecting the gas to a high voltage, high current discharge. The heated gas takes the form of an electrically conductive cylinder, and the oscillatory transient current resulting from the discharge induces a varying magnetic field surrounding the gas which "pinches in" or squeezes the radial dimension of the conductive gas as a function of the current flow. The radius of the gaseous cylinder thus varies as a function of time. It is often desired to know the character of any variation in the radius of a conductive member and thus an accurate radius measurement arrangement is required. Accordingly, an object of this invention is to provide a rapid and reliable method and apparatus for measuring a dimension of an electrically conductive body.

A further object is to provide an accurate and reliable method and apparatus for measuring a dimension of an electrically conductive body that is relatively inaccessible to conventional measuring techniques.

The invention makes use of the electrical phenomenon wherein a magnetic field is developed by passing a current through a first conductor, and the related phenomenon wherein the developed magnetic field induces a measurable voltage in a second conductor located near the first conductor.

According to one arrangement of the invention, an electrical current of determinable value is passed through the electrically conductive body whose dimension is to be measured, so as to develop a magnetic field surrounding the path of the current. A conductor, hereinafter called a probe, is arranged to form an induction loop coupled to the conductive body with the field operating to induce within the loop a signal voltage that is a function of the rate of change of the magnetic flux linking the loop. In turn, the magnetic flux linking the induction loop is a function of, among other determinable parameters, the effective distance of the probe from the axis of the conductive body and the dimensions of the conductive body (i.e., the radius and the length where the body is a cylindrical one). By the placement of a suitable load impedance in series with the probe, a measurable output or indicating voltage is developed across the load. This voltage can be used to indicate the dimension of interest. For example, the radius of the body can be determined if its length is known, or the length of the body can be determined if its radius is known.

According to one feature of the invention the probe is arranged so that it effectively coincides with the surface of the conductive body. In the case of a cylindrical conductive body whose radius varies with time, the probe is located effectively within the radius variations of the conductive body. Such an arrangement produces a greater variation in output voltage with changing radius and thus a greater sensitivity than would be the case if the probe were effectively at a more remote distance from the conductive body.

According to another feature of the invention, the load impedance is resistive and is placed in series with the internally induced signal voltage. Thus, the output indicating voltage developed across the resistive load is a function of the rate of change of magnetic flux linking the induction loop. (The magnetically induced voltage by Lenz' law.) The radius of the conductive body may be determined by performing a mathematical integration on the function described by the output indicating voltage.

According to still another feature of the invention, the load impedance placed serially in the induction loop comprises an integrating network. For example, the load impedance may comprise an inductance placed in series with a resistance. In such an arrangement the output voltage developed across the resistance is directly related to the magnetic flux linking the induction loop rather than to the rate of change of flux. In this instance the integration is performed electrically instead of mathematically, as described above.

In the two sheets of drawing, wherein like reference characters designate like parts:

FIG. 6 is a front elevation view, partly schematic, showing a different form of measuring arrangement according to the invention;

FIG. 7 is a schematic representation of the measuring arrangement of FIG. 6; and FIG. 8 is a schematic view of apparatus for measuring the dimensions of a machined part.

Figure 1:
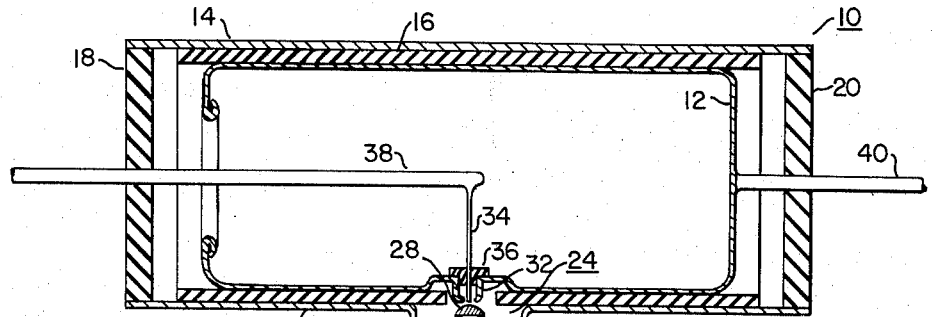
FIG. 1 is a sectional view showing one form of apparatus for heating a plasma to extremely high temperatures.

Referring to FIG. 1, a device adapted for using an embodiment of the invention is illustrated in connection with apparatus wherein a discharge current is sent through a column of ionized gas to generate a cylindrical plasma of time-varying radius. Since the plasma is continually varying in radius, the measuring of its current density has proved extremely difficult. In this connection the present invention is utilized to determine the character of the variation in the plasma radius. The apparatus comprises a cylindrical capacitor 10, having an inner cylindrical metal plate 12, and an outer cylindrical metal plate 14, separated by insulating material 16 of high dielectric strength, such as several layers of polyester film. The two ends of the outer cylindrical metal plate 14 are closed by insulating windows 18 and 20.

Midway between the ends of the cylindrical capacitor 10, in a surface cavity region, there is mounted a discharge tube 22, hereinafter called a pinch tube, and a high voltage spark discharge switch 24. The pinch tube 22 (as shown in more detail in FIG. 2) comprises a short length of tubing 26 made of insulating material which is closed at one end by a conductive disc electrode 28. The other end of the tubing 26 is sealed on a ring-like electrode 30, mounted in an opening in the outer cylindrical plate 14.

The disc electrode 28 also constitutes one of the main electrodes of the spark discharge switch 24. The other main electrode 32 of the spark discharge switch 24 is annular in shape and is mounted coaxially adjacent to the disc electrode 28 in an opening in the inner cylindrical plate 12. An elongated electrode 34, serving as a trigger electrode for the spark discharge switch 24, is mounted concentrically within the annular electrode 32 and insulatingly spaced therefrom by an insulating member 36. The end of the trigger electrode 34 projects slightly beyond the opening in the annular electrode 32 and into the space between the main electrodes 28 and 32.

In one operative embodiment the spark discharge switch 24 is designed to withstand, until it is triggered, a potential difference of 300 kilovolts when the spacing between main electrodes 32 and 28 is ¼ inch or more. To avoid spontaneous breakdown of the spark discharge switch, prior to triggering, as well as electrical flashover at various insulating surfaces within the capacitor 10, the interior volume defined by the outer cylindrical plate 14 is filled with an insulating gas maintained at a relatively high pressure. For example, sulfur hexafluoride at about 200 pounds per square inch, absolute pressure may be used.

A triggering pulse for the spark discharge switch 24 is fed through a conductor 38 projecting through one of the insulating windows 18. High voltage for the capacitor 10 is fed to the inner cylindrical plate 12 through a conductor 40 projecting through the other insulating window 20. For convenience the outer cylindrical plate 14 is maintained at ground reference potential.

Operation of the pinch tube 22 requires a highly conducting plasma through which a large current can be discharged. For this purpose an electromagnetic shock tube 42 is joined to the ring electrode 30 in communication with the pinch tube 22. The shock tube 42 comprises a T-shaped envelope 44 and a pair of spaced electrodes 46 mounted intermediate to the arms of the T. Energy from a high voltage capacitor (not shown) is supplied to the electrodes 46 by means of two leads 48 extending through the arms of the T. A quantity of ionizable gas, such as deuterium, is contained within the envelope 26, 30, and 44, formed by both the pinch tube 22 and shock tube 42.

In operation, the cylindrical capacitor 10 is charged to a high voltage of the order of 300 kilovolts. The trigger electrode 34 of the spark discharge switch 24 is initially maintained at a potential slightly below that of the annular electrode 32 (which is at the same high potential of the inner cylindrical plate 12). The shock tube 42 is energized to become conductive by discharging a high voltage capacitor across the spaced electrodes 46. This sends an electromagnetic shock wave down the shock tube 42 and into the pinch tube 22, causing the confined deuterium gas to heat to a high temperature of the order of 30,000 degrees centigrade and causing the gas to ionize. A switching pulse is now applied to the trigger electrode 34, raising its potential above that of the annular electrode 32 and causing, first, a trigger spark discharge between the trigger electrode 34, and either the end of the disc electrode 28 or the main electrode 32, and then the main spark discharge between the two main electrodes 28 and 32. The timing is arranged so that the main spark discharge occurs when the shock wave reaches the disc electrode 28 of the pinch tube.

When the main spark discharge occurs, it effectively applies the full voltage of the cylindrical capacitor 10 across the two electrodes 28 and 30 of the pinch tube 22. The cylindrical capacitor 10 potential causes a discharge current flow through the pinch tube 22, causing a heavy discharge current (heavy due to the conductivity of the plasma) to flow through the plasma. The distributed inductance appearing between the cylindrical plates 12 and 14 forms a resonant system with the capacitance of the cylindrical capacitor 10, so that the discharge current which flows along the plasma is an oscillatory transient current at high frequency of the order of megacycles per second.

Furthermore, due to the phenomenon of skin effect at high frequencies, the current flows along the surface of the plasma in a hollow, cylindrical path. The high frequency discharge current flowing through the plasma gives rise to a varying magnetic field surrounding the plasma. The varying magnetic field builds up and decays as a function of the current flow. The magnetic field thus developed exerts a constraining or pinching effecting on the current carrying plasma whereby the plasma alternatively compresses to a smaller radius and then expands to a larger radius. It is desired to know the character of the variations in radius of the plasma. Obviously, the measurement of the rapidly varying radius by optical or mechanical means may give rise to certain inaccuracies.

Figure 2:
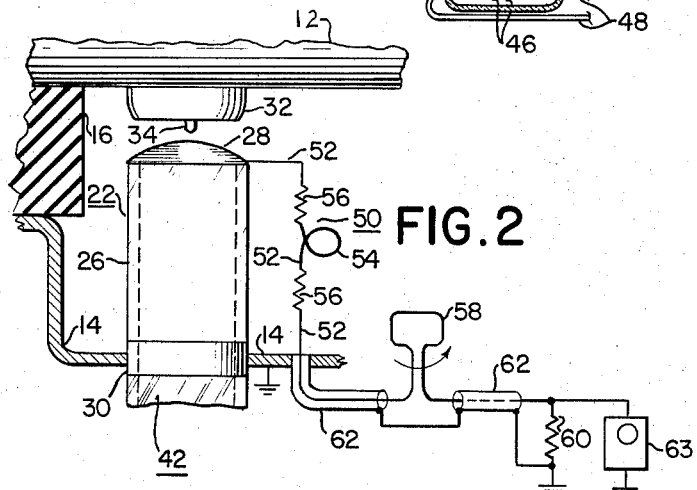
FIG. 2 is an enlarged view, partly schematic, of a portion of the apparatus of FIG. 1 showing one form of measuring arrangement according to the present invention.

In accordance with the present invention, and as shown in FIG. 2, an induction probe 50 is placed close to the wall of the pinch tube 22 so as to be near the plasma and within the influence of the magnetic field surrounding the plasma. In the embodiment shown, the induction probe 50 comprises an elongated conductor 52, mounted adjacent to the tubing 26, and substantially coextensive with the longitudinal extent of the plasma. The conductor 52 is formed with one or more fixed main detection coils 54, one of which is shown and the purpose of which will later be explained in more detail. In addition, a pair of current limiting resistors 56 are placed in series with the conductor 52, one on each side of the coil 54. One end of the induction probe 50 is connected to the disc electrode 28, and the other end is connected in series with a movable vernier compensation coil 58 and a grounded output load resistor 60 through two portions of shielded cable 62. The vernier compensation coil 58, like the main coil 54, is positioned to be within the influence of the magnetic field surrounding the plasma. The outer shields of the cable portions 62 are connected to ground reference potential. Since the outer plate 14 of the cylindrical capacitor 10 is also grounded, the probe 50 forms an induction loop across the plasma discharge that occurs between the outer plate 14 and disc electrode 28. A voltage sensitive device, such as an oscilloscope 63 is connected across the load resistor 60.

Figure 3:
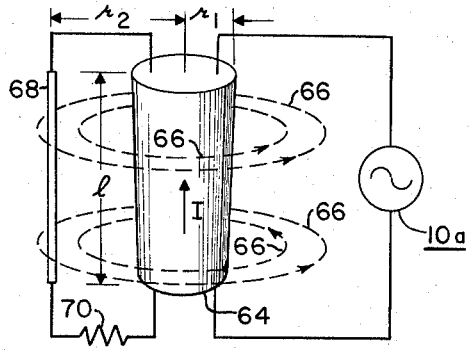
FIG. 3 is a schematic view showing two spaced parallel conductors linked by a magnetic field induced by current flowing through one of the conductors and useful in explaining the operation of the present invention.

For a clearer understanding of the operation of the probe 50 above-described, reference is made to FIG. 3 illustrating a first cylindrical conductor 64 having a radius represented by $r_1$ and a length represented by $l$. If a current having a value represented by I is passed through the first conductor 64 from a high frequently source 10a a varying magnetic field will be established around the current carrying first conductor 64. In the drawings, the flux lines are represented by circular arrows 66 surrounding the first conductor 64. If a second conductor 68 of length $l$ is placed adjacent and parallel to the current carrying first conductor 64, spaced by a distance $r_2$ from the first conductor 64, and is coupled in a closed circuit loop with the first conductor 64, the loop defined by the two conductors 64 and 68 will link an amount of flux $\phi$ determined by the formula, (1) $$\phi = \frac{\mu_0 l}{2\pi} I \, \text{Log}_e \left(\frac{r_2}{r_1}\right)$$

where $\mu_0$, the magnetic permeability of vacuum, or air, is a constant equal to $4\pi \times 10^{-7}$ henrys per meter and the other dimensions are in the MKS system of units. The voltage V induced around the circuit loop including the conductor 68 is given by, $$V = -\frac{d\phi}{dt}$$

or the induced voltage is equal to the rate of change of magnetic flux with time. The above and following formulas are applicable when the frequency of the applied current and the conductivity of the conductors through which the current flows are sufficiently high so that the current flows essentially along the surface of the conductor. Furthermore, it is asumed that the current I, flowing in the first conductor 64, is substantially higher than the current which flows in the circuit loop as a result of the induced voltage. Thus, if a resistive load is connected in series with the circuit loop, shown in the drawing by connecting the two top ends of the conductors 64 and 68 and connecting a resistor 70 between the two bottom ends of the conductors, the induced voltage appearing across the load 70 will be a function of the rate of change of flux linking the two conductors 64 and 68.

Figure 4:
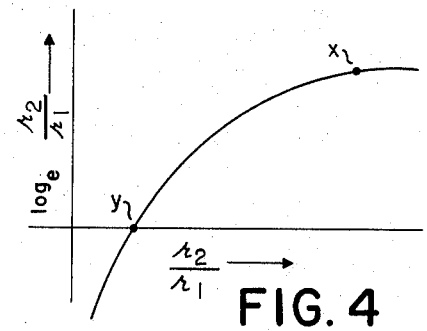
FIG. 4 is a graph useful in explaining the operation of the invention.

From an examination of the expression for the flux $\phi$ linking the two conductors 64 and 68, it is apparent that if only the radius $r_1$ of the first conductor 64 changes, the flux linking the loop will change accordingly, thereby changing the induced voltage developed across the external resistor 70. Hence the change in induced voltage can be taken as a measure of the change in the radius $r_1$ of the first conductor 64. However, the amount of change in output voltage with changing radius $r_1$ of the first conductor 64 is a function of the distance $r_2$ of the second conductor 68 from the first conductor. As will be clearly observed in the graph of FIG. 4, which is a plot of $$\mathrm{Log}_e\left(\frac{r_2}{r_1}\right)$$

versus the ratio $$\left(\frac{r_2}{r_1}\right)$$

if the distance $r_2$ is substantially greater than $r_1$, this will correspond to an operating point $x$ on the nearly horizontal portion of the curve. Any change in the radius $r_1$ about the point $x$ will cause only a slight change in an already large value of $$\mathrm{Log}_e\left(\frac{r_2}{r_1}\right)$$

and hence only a slight percentage change in the output voltage. However, if the distance $r_2$ is substantially equal to the radius $r_1$, corresponding to an operating point $y$ where the curve intersects the horizontal axis $$\left(\mathrm{Log}_e\left(\frac{r_2}{r_1}\right)=0\right)$$

it will be seen that a change in radius $r_1$ will produce a relatively large change in an already low or zero value of the function $$\mathrm{Log}_e\left(\frac{r_2}{r_1}\right)$$

and hence will produce a relatively high percentage change in the output voltage.

It is now clear that for maximum sensitivity the second conductor 68 should be placed as close as possible to the first conductor 64 so as to minimize the magnetic flux linking the two conductors 64 and 68. One way of effecting this is to physically place the two conductors 64 and 68 in close proximity to each other. However, when one of the conductors is a conducting gas or plasma within a container, the two conductors will be separated at all times by the container wall.

Figure 5:
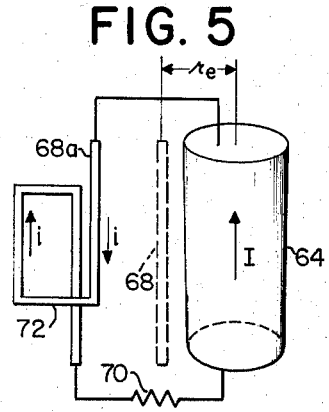
FIG. 5 is a schematic representation of a measuring arrangement using an induction loop according to the invention.

In accordance with the invention the two conductors can be made to effectively coincide with one another in spite of their apparent physical separation. If the second conductor 68a is formed with a coil portion 72, as shown in FIG. 5, with the plane of coil 72 oriented to link magnetic flux, it will be seen that there will now be two induction loop portions connected in series opposing instead of the single induction loop which was formerly present. The original loop will constitute one induction loop portion, and the coil 72 will constitute the second induction loop portion. Because of the series opposing connection of the two induction loop portions the total flux originally linked by the first loop portions will be reduced by the flux linked by the coil. The effect is the same as moving the original straight conductor 68 (shown in dotted lines) to a new and closer position, at an effective distance $r_e$ from the first conductor 64. By physically dimensioning the coil 72 to link as much flux as the uncoiled portion of the conductor 68a, the total flux linking the two conductors 64 and 68a, can be reduced effectively to zero. In the case of a first conductor 64 of radius $r_1$ this would correspond, in effect, to placing an uncoiled conductor 68 at an effective distance $r_e$ which is made by design equal to the radius $r_1$.

The net flux linked by an induction loop provided with a flux reducing or detection coil 72 can be expressed by the same general formula as (1) set forth above, $$(2) \qquad \phi = \frac{\mu_0 l}{2\pi} I \, \mathrm{Log}_e \frac{r_e}{r_1}$$

where $r_e$, the effective distance of the second conductor 68a is, in the case where $r_e$ is greater than $r_1$, the distance at which a straight or uncoiled conductor would be placed in order to have the resulting induction loop link the same net flux as an induction loop containing a detection coil. In the case where $r_e$ is less than $r_1$ the above Formula 2 still holds true despite the fact that if one were to physically place a second conductor 68 beneath the surface of a first cylindrical conductor 64, the phenomenon of skin effect would prevent the flow of current around the induction loop.

Referring again to FIG. 2, the main detection coil 54 operates to reduce the net flux linked by the induction loop. The main coil 54 is designed to place the induction probe 50 approximately at the desired effective distance $r_e$. The effective distance of the induction probe 50 can be varied by means of the vernier compensation coil 58, as by rotating the vernier compensation coil 58 to link more or less of the magnetic flux or by moving the vernier compensation coil 58 closer to or farther away from the plasma in the pinch tube 22. Thus, either the position or the orientation of the vernier compensation coil 58 can be varied to provide any desired effective location of the induction probe 50.

In general the optimum effective location of the induction probe 50 for determining a time varying radius, such as the radius $r_1$ of the plasma, is a position intermediate the radius excursions. This will insure that at some time during the radius excursions the amount of flux linked by the induction loop and the resulting voltage induced therein will be zero.

There are various methods which can be used to determine the effective distance $r_e$ of the induction probe 50. Two of these methods will now be described. In the first method, the pinch tube 22 is filled to a desired radius $r_1$ with a column of conducting liquid, such as mercury, in place of the deuterium gas. This provides a first conductor of known fixed radius $r_1$. Then for a given orientation of the vernier compensation coil 58, the cylindrical capacitor 10 is discharged through the mercury column. During the discharge, the discharge current and the output voltage across the load resistor 60 are recorded on the oscilloscope 63 and a photograph is taken of the transient oscilloscope traces. These steps are repeated for different orientations of the vernier compensation coil 58. For that orientation of the vernier coil 58 which produces the minimum voltage output the effective distance $r_e$ is equal to $r_1$.

In the second method, the conducting gas or plasma is replaced by a conductor of known radius $r_3$, and the discharge is produced in the same manner as above-described. Both the discharge current and the output voltage are recorded. Then without changing the orientation of the vernier coil 58, the same procedure is followed using another rod of different radius $r_4$ from the first rod and using the same value of discharge current. The output voltages $V_3$ and $V_4$ corresponding to rod radii $r_3$ and $r_4$, respectively, are then substituted into the formula below:

$$(3) \qquad r_e = \frac{r_3^{\left(\frac{V_4}{V_4-V_3}\right)}}{r_4^{\left(\frac{V_3}{V_4-V_3}\right)}}$$

giving the effective distance $r_e$. By repeating this procedure for different settings of the vernier compensation coil 58 the positions of the vernier coil can be calibrated as to the effective distance $r_e$, at the position required for optimizing the accuracy of a particular measurement. After the above calibrations have been made, a desired effecctive distance $r_e$ may be selected and the following procedure may be carried out to measure the radius variations of the plasma.

The plasma is first subjected to a discharge of the cylindrical capacitor 10. During the discharge the output voltage and discharge current waves are recorded. The radius $r_1$ is then calculated from the following formula:

$$(4) \qquad r_1(t) = r_e \epsilon^{\left(\frac{2\pi \int_0^t V(t)dt}{\mu_0 l\, I(t)}\right)}$$

There will thus be obtained an expression for the radius $r_1$ of the plasma which varies as a function of time.

In accordance with one operative embodiment, an induction probe having a length $l$ of 1.5 inches was connected across a pinch tube 22 having an inside diameter of 0.5 inch and an outside diameter of .625 inch. The conductor comprised No. 34 wire and had a two turn loop of approximately 0.5 inch in diameter serving as the main compensation coil 54. Two resistors 56 each having a resistance of 50 ohms and a wattage rating of ½ watt were placed in series with the main coil 54. For the output resistance 60 a resistor having a resistance of 1 ohm was used.

An examination of the Formula 4 given above to calculate the radius $r_1$ of the plasma shows that an integration of the output voltage is involved in the calculation. The integration may be performed mathematically upon the measured voltage. Alternatively, a different induction loop circuit may be used which contains within itself an integrating network that simplifies the computation. This embodiment will now be described.

Referring to FIG. 6 the induction probe 50 of FIG. 2 is replaced by an induction probe 74 exhibiting a high inductance. The probe 74 comprises a multi-turn conductor wound around and along the length of the pinch tube 22. Otherwise, the apparatus is the same as that shown in FIG. 2. The multi-turn conductor probe 74 contains a certain amount of inductance L by virtue of its many fine turns. The turns also serve to provide the main compensation in the same manner as did the main coil 54 in FIG. 2. As shown schematically in FIG. 7, the multi-turn conductor probe 74 can be thought of as including a straight second conductor 75 spaced from the plasma (first conductor 76) to be measured by an effective distance $r_e$. In series with the straight conductor 75 there appears an inductance L (the inductance of the multi-turn conductor probe 74) and a load resistance R (the resistor 60). The flux linking the second conductor 75 gives rise to a voltage $$V_1 = -\frac{d\phi}{dt}$$

induced within the induction loop. The induced voltage causes a current $i$ to flow through the inductance L and resistance R. Summing up the voltage drops in the circuit loop, the following expression is obtained:

$$L\frac{di}{dt} + Ri = V_1$$

where $$V_1 = \frac{d\phi}{dt}$$

By making the impedance of the inductance L much greater than that of the resistance R, the combination of inductance and resistance becomes an integrating network. The induced voltage becomes essentially equal to the voltage drop across the inductance; thus:

$$L\frac{di}{dt} = -\frac{d\phi}{dt}, \; Li = -\phi$$

and $$i = -\frac{\phi}{L}$$

Thus the output voltage across the resistance R is given by $$V = iR = -\frac{R}{L}\phi$$

where $\phi$, as in the first embodiment, is given by the formula $$\phi = \frac{\mu_0 l}{2\pi} I \, \text{Log}_e \left(\frac{r_e}{r_1}\right)$$

From these two expressions results the following expression for the radius $r_1$ $$r_1(t) = r_e \epsilon^{\left(\frac{2\pi L V(t)}{\mu_0 l R I(t)}\right)}$$

The effective distance $r_e$ can be determined in the same manner as was described above in connection with the induction probe 50. Once the effective distance $r_e$ has been determined and set to the distance giving optimum sensitivity of measurement, measurements can be made of the output voltage V and discharge current I. From these measurements and from a knowledge of other parameters such as resistance R, inductance L, and length $l$, the radius $r_1$ can be determined.

In accordance with one operative embodiment of the apparatus shown in FIG. 6, a multi-turn conductor probe 74 was provided with 400 turns of No. 34 wire, with each turn having an inside diameter of .029 inch. The conductor probe 74 was 2.8 inches in over-all length and was wound around the outside of a pinch tube 22 which was 0.875 inch in outside diameter and 0.75 inch in inside diameter. The length of the pinch tube along which the conductor probe 74 was extended was 1.5 inches. The inductance L of the conductor probe 74 was 1 microhenry, and the output resistance 60, as in the previous embodiment, had a resistance of 1 ohm.

Although the invention is particularly useful in measuring a radius which varies with time, it may also be used to measure a radius which is fixed or relatively fixed in value, such as the radius of a machined or partially machined part. Although the apparatus above-described is adaptable for such measurements, a more simplified apparatus may be used, as shown schematically in FIG. 8. In this apparatus an alternating current source 77 of known high frequency is applied to a first conductor 78 to be measured, such as a machined part, so as to pass a steady high frequency alternating current through the first conductor 78 rather than a transient one as was done in the pinch tube. Otherwise the apparatus is the same as in the foregoing embodiments with the induction probe 80 being shown generally in block form. In this embodiment, the voltage sensitive device placed across the load may comprise a voltmeter or an oscilloscope that is calibrated to read directly in terms of radius or length. While the invention has been described in connection with the measurement of a radius, it will be appreciated that it can be used to measure the length of a body where the radius is known.

What is claimed is:

1. A method of measuring a dimension of a cylindrical conductor, comprising: arranging a conductive member to form two series-opposing induction loops in series circuit with said conductor, said conductor forming a part of one of said induction loops; passing a current through said conductor, to develop a magnetic field linking said induction loops with said conductor; disposing said loops to link substantially equal amounts of magnetic flux; and measuring the voltage developed across a load connected serially in said induction loops.

2. A method of measuring the radius variations of a cylindrical conductive plasma that is subjected to a varying current discharge, said method comprising: mounting an elongated conductor adjacent and parallel to said cylindrical plasma and arranged in a main inductive circuit loop therewith, thereby to induce a time varying voltage in said main circuit loop that is a function of the rate of change of magnetic flux linked thereby in response to said varying current discharge; reducing the magnetic flux linked by said main loop by means of an auxiliary inductive loop connected serially in said main loop, with the axis of said auxiliary loop oriented substantially perpendicular to the longitudinal axis of said plasma, to increase the relative variations, resulting from said plasma radius variations of the effective magnetic flux operating on said series connected loops, thereby to increase the relative variations of said induced voltage resulting from said plasma radius variations; and applying said induced voltage to a load connected in series with said induction loops to obtain a measure of said plasma radius variations.

3. Apparatus for measuring the radius variations of a substantially cylindrical conductive plasma that is subjected to a varying current discharge, said apparatus comprising: an elongated conductor mounted adjacent and parallel to the axis of said cylindrical conductive plasma, said elongated conductor including a coiled portion intermediate its ends with the axis of said coiled portion disposed substantially perpendicular to the plane defined by the axis of said plasma and said elongated conductor; a load impedance; means connecting said elongated conductor and said load impedance in series with and along the length of said plasma, whereby to induce across said load a voltage that is a function of the radius variations of said plasma; and a voltage sensitive indicating device connected across said load impedance.

4. Apparatus as in claim 3, wherein said load impedance is resistive in nature.

5. Apparatus for measuring the radius variations of a cylindrical conductive plasma that is subjected to a varying magnetic field surrounding said plasma, said apparatus comprising: means for causing alternating current to flow through the plasma to develop a varying magnetic field surrounding the plasma; an elongated conductor mounted adjacent to said plasma and extending along the length thereof, said elongated conductor including a coiled conductor surrounding and forming a helix about said plasma; a load impedance; means connecting said load impedance, said elongated conductor, and said conducting plasma in a closed electrical circuit, thereby to induce across said load impedance a voltage that is a function of the radius variations of said plasma; and a voltage sensitive indicating device connected across said load impedance.

6. An apparatus for measuring a dimension of a conductive work piece, comprising: electric circuit connection means engaging each end of the work piece for receiving a high frequency electric power thereacross to create varying current flow along the surface of the work piece; an induction loop probe positioned adjacent to the surface of the work piece to intercept any magnetic fields created by high frequency current flow in the work piece; a vernier compensation coil arranged to intercept a portion of any magnetic fields created by high frequency current flow in the work piece; a resistive load of an electric impedance greater than the impedance of the work piece; said loop probe, said compensation coil, and said resistive load being serially connectable across said connection means; and means for detecting the current flow through said resistive load as a result of inductive coupling between said loop probe and the work piece as modified by said compensation coil.

7. An apparatus for measuring a dimension of an electrically conductive workpiece, comprising: electric circuit connection means engaging each end of the work piece; a high frequency power source connectable across said connection means; an induction loop probe positioned adjacent to the radial surface of the work piece; a vernier compensation coil; a resistive load; said probe, said coil, and said load being serially connectable across said connection means and being of a total impedance greater than that of the work piece; and other means responsive to current flow through said load as a result of inductive coupling between said loop probe and the work piece as modified by said compensation coil for providing a signal indicative of a work piece dimension.

8. In combination with a cylindrical conductor adapted for measurement of a dimension thereof:
an elongated conductive member mounted adjacent to and extending along the length of said cylindrical conductor, said conductive member including at least one coiled portion between its ends, with said coil portion positioned with its axis at an angle to the axis of said cylindrical conductor;
a load impedance;
terminal means connected across the ends of said cylindrical conductor;
said conductive member and said load impedance connected in series across said terminal means;
means connected across said terminal means for passing a high frequency alternating current through said cylindrical conductor whereby to induce across said load impedance a voltage that is a function of the dimension to be measured;
and a voltage sensitive indicating device connected across said load impedance.

9. The invention according to claim 8 wherein said load impedance is resistive in nature.

10. The invention according to claim 8 wherein said load impedance comprises an integrating network.

11. The invention according to claim 8 wherein said conductive member comprises a coiled helix.

12. An apparatus for measuring a dimension of a cylindrical conductive workpiece comprising: electric circuit connection means engaging each end of the workpiece; a high frequency power source connectable across said connection means; an induction loop probe positioned adjacent to the surface of the workpiece; a vernier compensation coil; a resistive load, said loop probe, said compensation coil, and said resistive load being serially connectable across said connection means; and means for detecting the current flow through said resistive load as a result of inductive coupling between said loop probe and the workpiece as modified by said compensation coil when said high frequency source energizes the workpiece.

13. An apparatus for measuring a dimension of a conductive cylindrical workpiece comprising: electric circuit connection means engaging each end of the workpiece for applying thereto a high frequency electric current; an induction loop probe positioned adjacent to the surface of the workpiece; a vernier compensation coil; a resistive load, said loop probe said coil, and said load being serially connectable across said connection means; and other means responsive to current flow through said resistive load as a result of inductive coupling between said loop probe and the workpiece as modified by said compensation coil for providing a signal indicative of the workpiece radial dimension.

References Cited by the Examiner

UNITED STATES PATENTS

| | | | |
|---|---|---|---|
| 1,892,826 | 1/33 | Bettison et al. | 324—37 |
| 2,015,401 | 9/35 | Jakosky | 324—1 |
| 2,351,201 | 6/44 | Gillis | 324—64 |

WALTER L. CARLSON, *Primary Examiner.*

SAMUEL BERNSTEIN, *Examiner.*